(12) United States Patent
Prager et al.

(10) Patent No.: US 8,342,076 B2
(45) Date of Patent: Jan. 1, 2013

(54) BRAKE ACTUATOR AND METHOD OF FORMING THE SAME

(75) Inventors: Christopher J. Prager, Concord, NC (US); Gary R. Sprague, Rock Hill, SC (US); Mohammad Abdallah, Charlotte, NC (US)

(73) Assignee: Indian Head Industries, Inc., Charlotte, MI (US)

( * ) Notice: Subject to any disclaimer, the term of this patent is extended or adjusted under 35 U.S.C. 154(b) by 955 days.

(21) Appl. No.: 12/341,221

(22) Filed: Dec. 22, 2008

(65) Prior Publication Data
US 2010/0154627 A1 Jun. 24, 2010

(51) Int. Cl.
*B60T 17/08* (2006.01)
*B60T 17/00* (2006.01)
(52) U.S. Cl. .......................... 92/63; 92/130 A
(58) Field of Classification Search .......... 92/63, 130 A, 92/130 R
See application file for complete search history.

(56) References Cited

U.S. PATENT DOCUMENTS

| | | | | |
|---|---|---|---|---|
| 3,479,927 A | * | 11/1969 | Elmer | 92/128 |
| 3,977,308 A | * | 8/1976 | Swander et al. | 92/63 |
| 4,565,120 A | * | 1/1986 | Gray et al. | 92/130 R |
| 4,960,036 A | | 10/1990 | Gummer et al. | |
| 6,349,629 B1 | * | 2/2002 | Plantan et al. | 92/99 |
| 6,477,939 B1 | * | 11/2002 | Siebke | 92/130 R |

* cited by examiner

*Primary Examiner* — Thomas E Lazo
(74) *Attorney, Agent, or Firm* — Howard & Howard Attorneys PLLC

(57) ABSTRACT

An improved diaphragm-type pneumatic brake actuator includes a flange case, a cover cooperable with the flange case, a flexible diaphragm extending between the flange case and the cover forming a lower pneumatic chamber and an upper pneumatic chamber on opposed sides of the diaphragm. A piston assembly is disposed in the cover for moving a spring between compressed and decompressed positions. A spring guide is disposed between the cover and the piston assembly in the upper chamber. The spring guide prevents direct contact of the spring with the cover to prevent formation of a corrosion cell.

27 Claims, 4 Drawing Sheets

BRAKE ACTUATOR AND METHOD OF FORMING THE SAME

FIELD OF THE INVENTION

The present invention relates to an improved diaphragm-type pneumatic brake actuator for vehicle braking systems.

BACKGROUND OF THE INVENTION

Pneumatic brake actuators form part of the pneumatic braking system of commercial vehicles having a large gross vehicle weight, including trucks, buses and trailers requiring a braking system which responds rapidly with substantial braking power. A typical diaphragm-type pneumatic brake actuator includes a housing having cup-shaped housing members including opposed rim or flange portions, a flexible diaphragm which is cup-shaped in its relaxed condition including a central portion, a generally conical side wall which surrounds the central portion and a generally radial rim portion which extends between the rim portions of the housing members. A brake actuator further includes a piston having a contact surface which engages the central portion of the diaphragm and which reciprocates with the central and side wall portions of the diaphragm in response to pneumatic pressure changes on opposed sides of the diaphragm from a first position, wherein the diaphragm is extended to a cup-shape, to a second inverted position to actuate the vehicle braking system. The brake actuator is connected by pneumatic lines to the pneumatic braking system of the vehicle to actuate the brake actuator. The piston is operably connected to the braking system of the vehicle to actuate the vehicle brakes.

The brake actuator system includes an emergency or spring chamber having a power spring which actuates the braking system of the vehicle when the pneumatic pressure of the vehicle falls below a predetermined minimum or the parking brake is actuated by the vehicle operator. In a spring brake chamber, a power spring is located in the housing between the end wall and the piston. During normal operation of the vehicle, the pneumatic pressure from the vehicle is received in the power spring chamber on the side of the cup-shaped diaphragm opposite the power spring and piston, thereby normally compressing the power spring. When the pneumatic pressure in the spring chamber falls below a predetermined minimum, the power spring expands and actuates the braking system of the vehicle.

The spring and service chambers may be combined in a "piggyback" assembly as disclosed, for example, in U.S. Pat. No. 4,960,036 assigned to the assignee of this application, wherein the assembly includes a central generally H-shaped flange case and the opposed ends of the flange case are enclosed by cup-shaped housing members to define a service chamber on one side of the flange case and a power spring chamber on the opposed side of the flange case. A central opening in the web portion of the flange case receives a pushrod having a head portion biased against the central portion of the diaphragm in the service chamber opposite the piston and power spring, such that the pushrod is driven against the piston in the service chamber to actuate the vehicle braking system when the pressure in the spring chamber falls below a predetermined minimum pressure. Alternatively, the spring and service chambers may be utilized as separate components of the brake actuator system as is known in the art.

FIG. 1 of the U.S. Pat. No. 4,960,036 illustrates the spring chamber of a conventional dual diaphragm or piggyback pneumatic brake actuator. The assembly includes a generally H-shaped flange case having a central web portion, an outer wall and a radially extending flange. The spring chamber is enclosed by a cover or head having an end wall, a side wall and a flange or skirt portion. The flange portion includes a generally radially extending portion, an axially extending portion and a radially inwardly extending lip which is inelastically deformed as discussed further below. The spring chamber further includes a piston having a central portion and an annular contact portion having an annular contact surface which normally engages the central portion of the diaphragm. The spring chamber further includes a powerful coiled power spring. A power spring and piston guide centers the power spring in the pneumatic chamber and the guide includes a rolled opening which centers dome-shaped end of the piston during operation of the brake actuator as further described below. The spring chamber further includes a pushrod which reciprocates through an opening in the web portion of the flange case as described below. The opening includes annular seals (not shown) which prevent leakage between the pneumatic chambers.

The operation of the pneumatic brake actuator is best shown in FIG. 1 of the U.S. Pat. No. 4,960,036. Pneumatic pressure or gas is received through opening in the side wall of the flange case, pressurizing pneumatic chamber. The gas pressure in pneumatic chamber acts against the flexible diaphragm, compressing the coiled power spring and driving the piston upwardly to be received in the power spring and piston guide. The flexible diaphragm is then cup-shaped and the side wall is frusto-conical or generally conical.

When the pressure in the pneumatic chamber falls below a predetermined minimum, which may occur as a result of a failure of the pneumatic braking system of the vehicle, the power spring expands, driving the pushrod through the opening in the web portion of the flange case, actuating the vehicle braking system. The chamber further serves as a parking brake when the vehicle motor is turned off and the parking brake is actuated by the operator.

A problem with any prior art diaphragm-type brake actuator is formation of a corrosion cell, which negatively impacts lifespan of the brake actuators of the kind. The inside surface of the cover or head of the brake actuator includes a protective coating formed from a powder or autophoretic composition. As the spring contacts the spring guide and/or the cover or when the cover contacts the spring guide, the protective coating is worn off and a galvanic corrosion cell is form between the spring and the cover, the spring and the spring guide, and the spring guide and the cover.

By way of background, the environment for many structures fabricated from metals of different types provides conditions favoring formation of natural corrosion cells. Formation of the corrosion cell results from the galvanic corrosion, which is an electrochemical process in which one metal corrodes preferentially when in electrical contact with a different type of metal and both metals are immersed in an electrolyte.

When two or more different sorts of metals come into contact in the presence of the electrolyte, a galvanic couple is established because different metals have different electrode potentials, wherein each metal acts as either a cathode or an anode. The electrolyte provides means for ion migration whereby metallic ions can move from the anode to the cathode. This leads to the anodic metal corroding more quickly thereby resulting in formation of the corrosion cell. The presence of electrolyte and conducting path between the metals cause corrosion where otherwise neither metal, if used alone, would have been corroded.

There has, therefore, been a longstanding need to reduce frictional wear between the spring and the head of the brake actuator to increase the life of brake actuators and to eliminate formation of the corrosion cell therebetween.

Another longstanding need is to increase performance of the brake actuator and to provide improved braking performance without increasing the size of the brake actuator.

Still another longstanding need exists for an improved design of the brake actuator that will prevent formation of the corrosion cell and to improve centering of the spring inside the head thereby increasing the life of the brake actuator. These and other problems have been solved by the improved brake actuator described below.

SUMMARY OF THE INVENTION

As set forth above, the improved diaphragm-type pneumatic brake actuator of this invention includes an enclosed housing having housing members including opposed flange or rim portions. One of the housing members, i.e. a cover presents an end wall and a side wall. The housing members are generally cup-shaped and the opposed rim portions generally include generally radially extending mating flange portions. In a tamper-resident spring brake actuator as described above, at least one of the flange portions forms a skirt which is inelastically deformed around the flange portion of the other housing member, permanently sealing the spring chamber. Alternatively, the spring brake chamber may be permanently sealed by a separate ring-shaped clamping element which is inelastically deformed around the flange portions of the housing members. However, the flange portions of the service chamber are generally secured by a conventional bolted clamp band and may thus be opened to replace the diaphragm.

The brake actuator further includes a flexible diaphragm which is cup-shaped in its extended position, as described above, including a central portion, a generally conical side wall portion which surrounds the central portion, and a generally radial outer rim portion received between the flange portions of the housing members and compressed to seal the pneumatic chambers formed on opposed sides of the flexible diaphragm. The diaphragm extends between the housing members forming a lower pneumatic chamber and an upper pneumatic chamber on opposed sides of the diaphragm. The brake actuator further includes a piston assembly disposed in said cover for moving a spring between compressed and decompressed positions. A piston of the piston assembly presents a contact surface normally in surface contact with the diaphragm center portion. A spring is positioned between the piston and the end wall of the cover. The spring is movable between compressed and decompressed positions as known to those skilled in the art.

A spring guide is disposed between the spring and the end wall of the cover. The spring guide is formed from a polymeric material. Preferably, the polymeric material includes mixture of a glass filled nylon or equivalent. The spring guide extends to a peripheral edge being generally equal to the diameter of the end wall of the cover thereby eliminating direct contact of the spring with the cover to prevent formation of a corrosion cell. The spring guide presents a neck portion extending to a flange portion terminating into the peripheral edge. The neck portion includes an inner wall extending to a bottom portion and then to an external wall being spaced from the inner wall. The external wall extends to the flange portion.

The spring guide includes a wedge portion extending from the external wall and presents a front wall extending generally perpendicular to the external wall. The front wall engages one of the terminal ends of the spring. A scalloped portion is defined in the flange of the spring guide. The scalloped portion is spaced from the external wall for locking the spring with the spring guide and to prevent relative movement of the spring beyond the scalloped portion as the spring is moved between compressed and decompressed positions.

An advantage of the present invention is to provide an improved spring guide that provides corrosion isolation, whereby the spring guide is fabricated from glass filled nylon material to insulate the spring from the head or cover of the brake actuator thereby eliminating the corrosion potential resulting from dissimilar metals are in direct contact with each other such as when the spring contacts the inner wall of the head.

Another advantage of the present invention is to provide an improved spring guide that provides improved surface configuration to house the spring inside the head thereby reducing the frictional engagement between the inner wall of the head and the spring to eliminate formation of a corrosion cell and improve lifespan of the spring.

Still another advantage of the present invention is to provide an improved spring guide configuration presenting a flange portion extending beyond the radius of the spring to prevent damage caused to the protective coating on the spring coil when the coil from rolls off the edge of the spring guide and contacting the inner wall of the head.

Other advantages and meritorious features of the improved brake actuator of this invention will be more fully understood from the following description of the preferred embodiment, the appended claims, and the drawings; a brief description of which follows.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
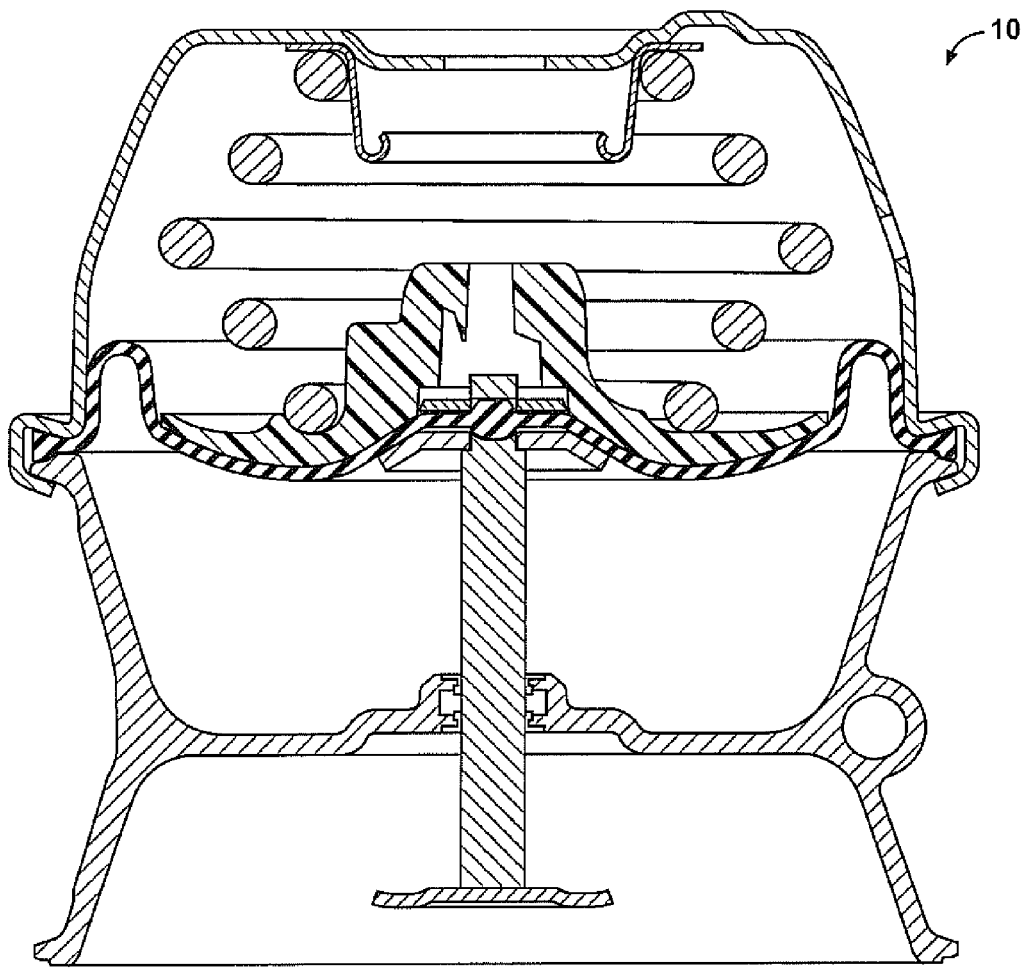
FIG. 1 illustrates a cross sectional view of a prior art brake actuator presenting a spring guide with a flange having diameter smaller than the diameter of the spring.
Figure 1A:
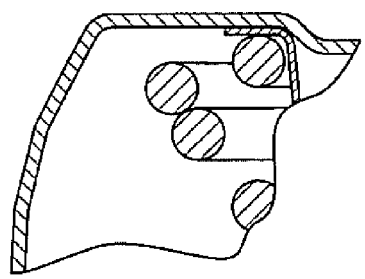
FIG. 1A illustrates a fragmental view of the prior art brake actuator showing a corrosion cell formed between a spring and a head portion of the brake actuator housing.
Figure 2:
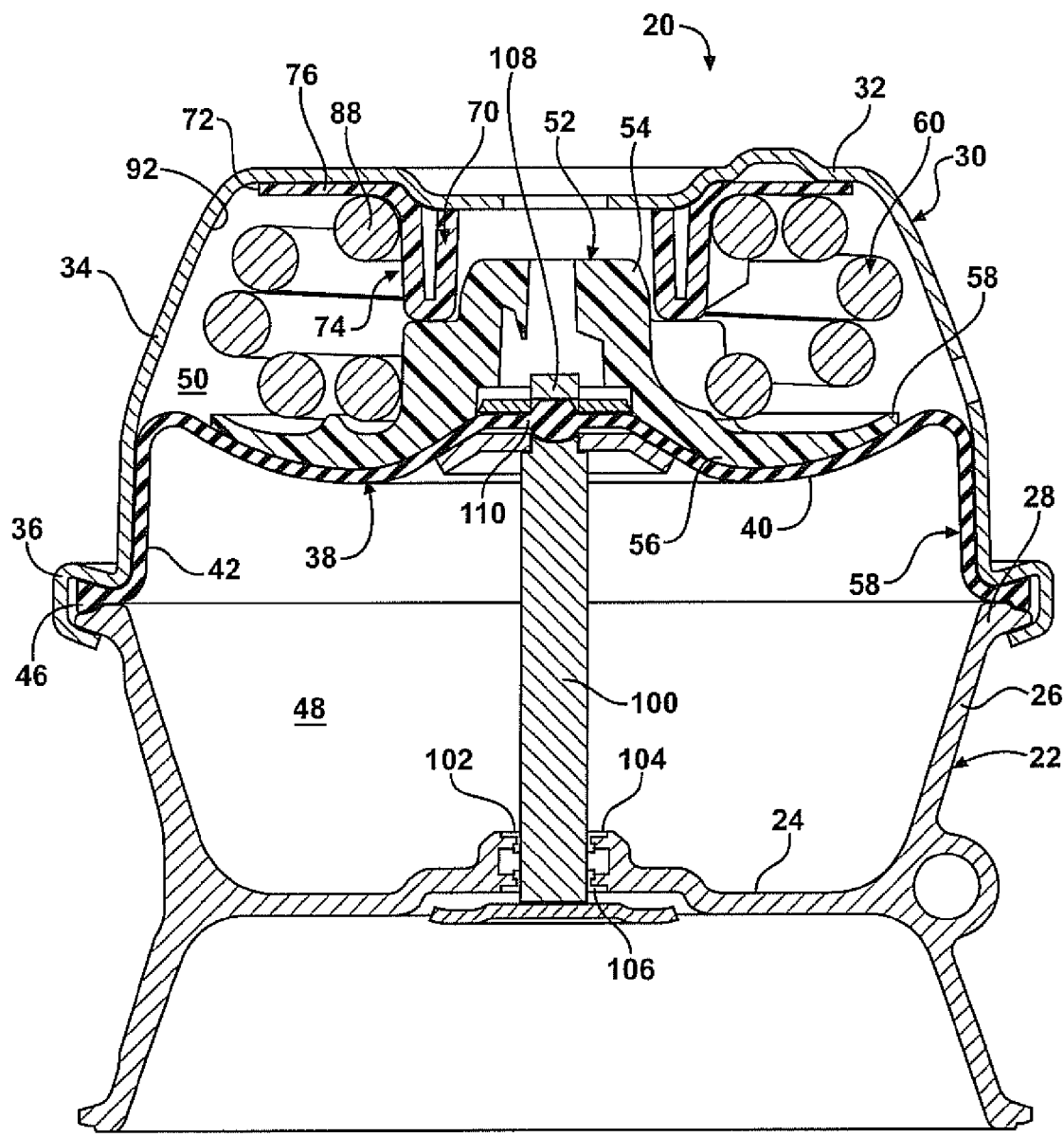
FIG. 2 illustrates a cross sectional view of an inventive brake actuator.

Referring to the Figures, wherein like numerals indicate like or corresponding parts, a prior art brake actuator is generally shown at 10 in FIG. 1. FIG. 2 illustrates an inventive brake actuator, generally shown at 20. As set forth above, and illustrated in FIG. 2, the spring brake actuator 20 includes a generally H-shaped flange case, generally indicated at 22, having a central web portion 24, an outer wall 26 and a radially extending flange 28. A cover or head portion, generally indicated at 30, of the brake actuator 20 includes an end wall 32, a side wall 34 and a flange or skirt portion 36. The brake actuator 20 further includes a flexible diaphragm 38 having a central portion 40, a side wall portion 42 and a radially extending rim portion 46. The flexible diaphragm 38 extends between the flange case 22 and the cover 30 forming a lower pneumatic chamber 48 and an upper pneumatic chamber 50 on opposed sides of the diaphragm 38.

The brake actuator 20 further includes a piston assembly with a piston, generally indicated at 52, having a central portion 54 and an annular contact portion 56 with an annular contact surface 58. The annular contact surface 58 engages the central portion 40 of the diaphragm 38. A powerful coiled power spring, generally indicated at 60, is compressed between the end wall 32 of the cover or head portion 30 and the piston 52. A power spring and piston guide (spring guide), generally indicated at 70, centers the power spring 60 in the upper pneumatic chamber 50.

The power spring exerts 2300 lbs of force on the spring guide 70. The piston 52 also exerts an additional 2300 lbs. force on the spring guide. It was unexpected that the composite spring guide 70 would withstand this amount of force when submitted to environmental cycling. Test results showed no damage to the composite spring guide after 250,000 cycles in temperatures ranging from −40 F to 175 F. The spring guide 70 may withstand a total force of up to 4300 lbs without limiting the scope of the present invention.

Alluding again to the spring guide 70, the novel material and configuration of the spring guide 70 was invented in response to a longstanding need to reduce frictional wear caused by the power spring 60 resulting in galvanic corrosion as set forth above. Another longstanding need is to increase performance of the brake actuator 20 by improving centering of the spring 60 inside the head portion 30 thereby increasing the life of the brake actuator 20. The spring guide 70 may also be formed from zinc, aluminum, or other materials that that include sacrificial properties thereby protecting the spring from corrosion.

As set forth above, a problem with any prior art diaphragm-type brake actuator is formation of the corrosion cell, which negatively impacts lifespan of the brake actuators of the kind. Formation of this corrosion cell results from galvanic corrosion, which is an electrochemical process in which one metal, i.e. the spring corrodes preferentially when in electrical contact with a different type of metal, i.e. the head portion and both metals are subjected to an electrolyte.

As best shown in FIGS. 2A and 2B of the the U.S. Pat. No. 6,349,629, the spring guide has insufficient diameter to prevent contact between the spring and the inner surface of the head portion. In response to numerous frictional contacts between the spring the inner surface of the head portion, the protective coating is worn away resulting in the aforementioned electrochemical process causing corrosion that reduces the life of the actuator.

The spring guide 70 of the present invention is a solution to the existing problem. The spring guide 70 is disposed between the spring 60 and the end wall 32 of the cover 30. The spring guide 70 is formed from a polymeric material. Preferably, the polymeric material includes a glass filled nylon or equivalent composite material. Preferably, the ratio of the glass to the nylon is 33 percent to 67 percent. This ratio is presented for exemplary purposes and is not intended to limit the scope of the present invention. The spring guide 70 extends radially outwardly to a peripheral edge 72 being generally equal to the diameter of the end wall 32 of the cover 30 thereby eliminating direct contact of the spring 60 with the cover 30 to prevent formation of the corrosion cell between the power spring 60 and the cover 30.

Figure 3:
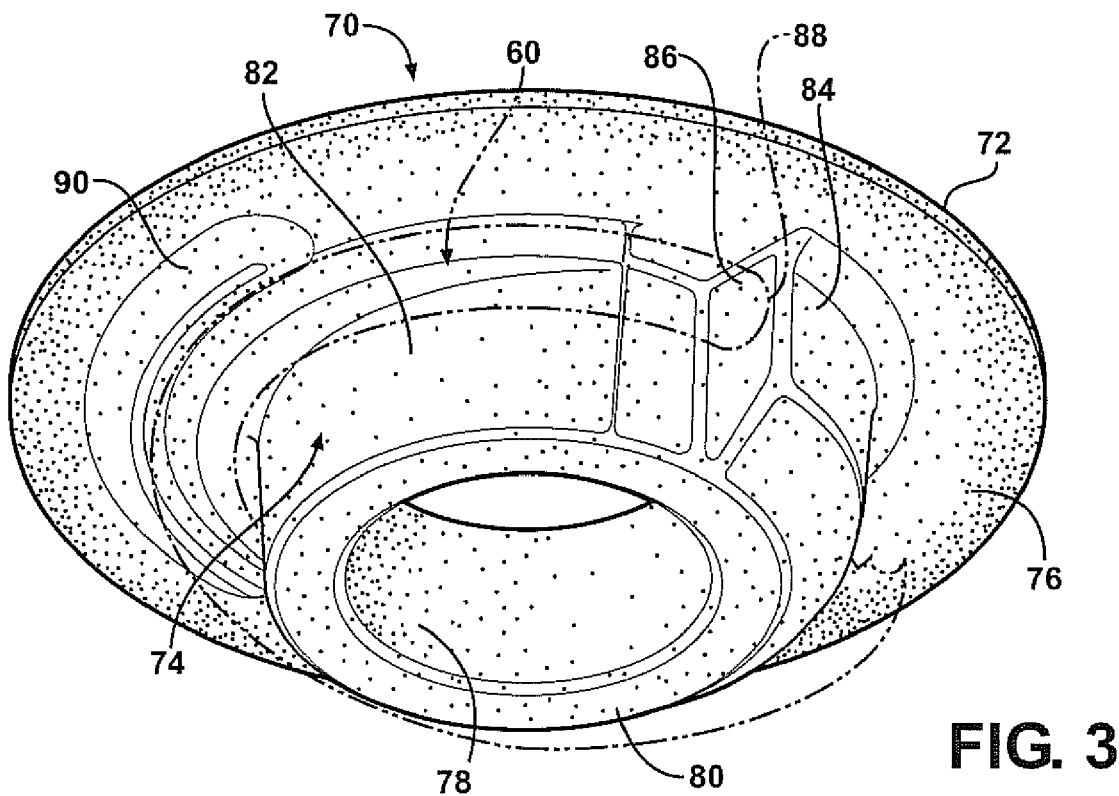
FIG. 3 illustrates a perspective view of the spring guide of the present invention.
Figure 4:
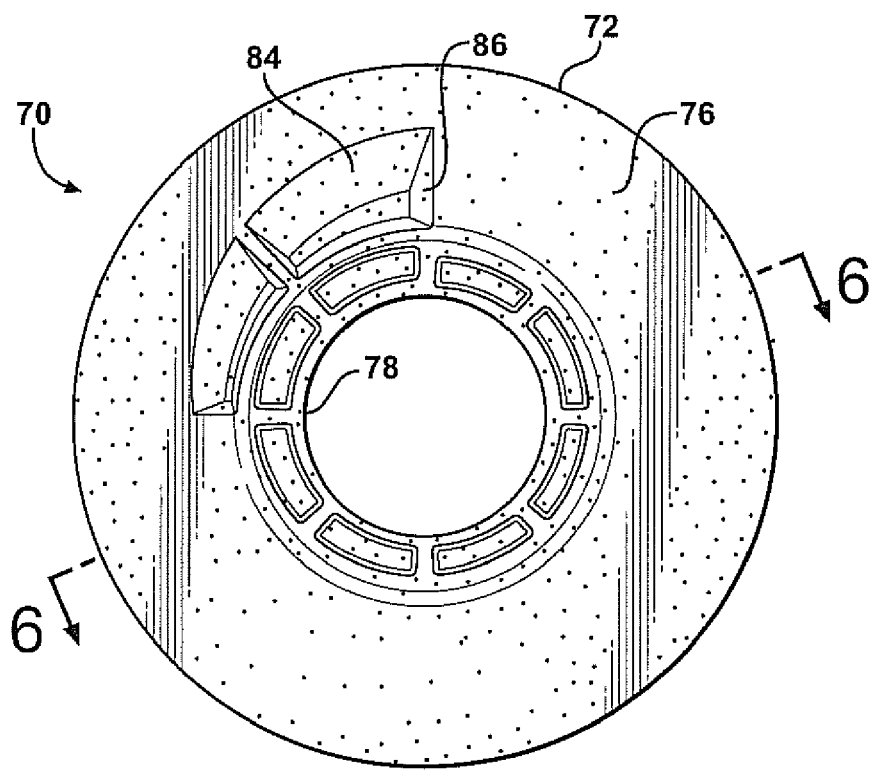
FIG. 4 illustrates a top view of the spring guide shown in FIG. 3.
Figure 5:
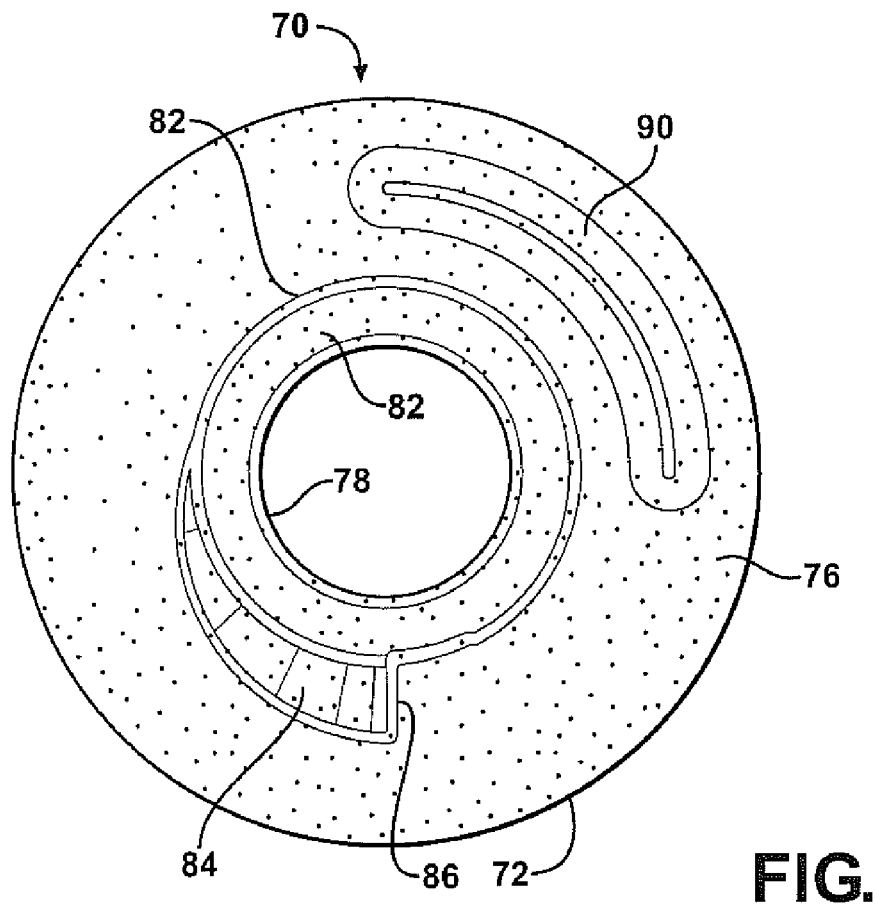
FIG. 5 illustrates a top view of the spring guide shown in FIG. 3.
Figure 6:
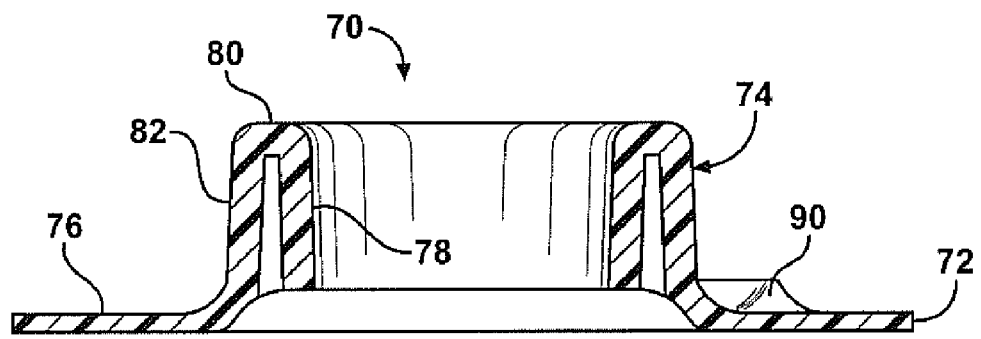
FIG. 6 illustrates a cross sectional view of the spring guide shown in FIG. 3 taken along lines 6-6.

The spring guide 70 presents a neck portion, generally indicated at 74 extending to a flange portion 76 terminating into the peripheral edge 72. The neck portion 74 includes an inner wall 78 that is spaced from an external wall 82 by a bottom portion 80. The external wall 82 extends to the flange portion 76. The spring guide 60 includes a first retaining portion or a wedge portion 84 extending from the external wall 82 and presents a front wall 86 extending generally perpendicular to the external wall 82. The front wall 86 engages one of the terminal ends 88 of the spring 60, as best shown in phantom in FIG. 3.

A second retaining portion or a scalloped portion 90 is defined in the flange portion 76 of the spring guide 70. The scalloped portion 90 is spaced from the external wall 82 for retaining the spring 60 between the scalloped portion 90 and the external wall 82 and to prevent relative movement of the spring 60 beyond the scalloped portion 90 when the spring 60 cycles between compressed and decompressed positions. The improved design of the spring guide 70 provides corrosion isolation, whereby the spring guide 70 is fabricated from an insulating material to insulate the spring 60 from the head portion or the cover 30 of the brake actuator 20. This eliminates the corrosion potential resulting from dissimilar metals of the spring 60 and the head portion being in direct contact with each other.

Another advantage the spring guide 70 provides is improved surface configuration to house the spring 60 inside the head portion 30 thereby reducing the frictional engagement between the inner wall 92 of the head portion 30 and the spring 60 further eliminating formation of the corrosion cell and improving lifespan of the spring 60 and the brake actuator 20. Still another advantage the spring guide 70 presents is configuration of the flange portion 76 extending radially outwardly beyond the outer radius of the spring 60 preventing damage of the protective coating on the spring 60 and the inner wall 92 of the head portion 30.

The brake actuator 20 further includes a pushrod 100 which reciprocates through an opening 102 in the web portion 24 of the flange case 22. The opening 102 includes annular seals 104 and 106. The pushrod 100 may either be spring biased against the central portion 40 of the diaphragm 38 or affixed to the diaphragm 38. In the disclosed embodiment, the pushrod 100 includes a threaded end portion 108 which is received through an opening 110 in the central portion 40 of the diaphragm 38 and secured to the diaphragm by nut (not shown). Leakage through the diaphragm opening 110 is prevented by a washer and a conical washer (not shown).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:
1. A pneumatic brake actuator for a vehicle braking system comprising:
   a flange case;
   a cover cooperable with said flange case defining a head assembly therebetween, said head assembly forming a lower pneumatic chamber and an upper spring chamber;

a power spring disposed inside said upper spring chamber, said power spring including terminal ends disposed radially inwardly from a peripheral edge of said power spring;

a piston assembly disposed in said head assembly, said piston assembly moved in a first direction by said power spring and in a second direction when said lower pneumatic chamber is pressurized thereby compressing said power spring; and a spring guide disposed between said cover and said piston assembly disposed in said upper spring chamber, said spring guide being configured to receive said spring and extending radially outwardly toward said peripheral edge of said spring when said spring is in a compressed position thereby preventing said power spring from contacting said cover in either a compressed or decompressed position preventing a galvanic cell from forming between said spring, said head, and said spring guide when said spring is disposed in either a compressed or decompressed condition.

2. A pneumatic brake actuator as set forth in claim 1 wherein said spring guide presents a neck portion extending to a flange portion terminating into said peripheral edge.

3. A pneumatic brake actuator as set forth in claim 2 wherein said neck portion presents an inner wall extending to a bottom portion and then to an external wall being spaced from said inner wall with said external wall further extending to said flange portion.

4. A pneumatic brake actuator as set forth in claim 3 including a wedge portion extending from said external wall and presenting a front wall extending generally perpendicular to said external wall to engage one of the terminal ends of said spring.

5. A pneumatic brake actuator as set forth in claim 4 including a scalloped portion defined in said flange of said spring guide with said scalloped portion being spaced from said external wall for locking said spring with said spring guide and prevent relative movement of said spring beyond said scalloped portion as said spring is moved between compressed and decompressed positions.

6. A pneumatic brake actuator as set forth in claim 1 wherein said spring guide is fabricated from at least one of a polymeric material and a non polymeric material having sacrificial properties thereby protecting said spring from corrosion.

7. A pneumatic brake actuator as set forth in claim 6 wherein said polymeric material includes a nylon filled with a glass.

8. A pneumatic brake actuator as set forth in claim 6 wherein said spring guide is fabricated from aluminum.

9. A pneumatic brake actuator as set forth in claim 8 wherein said piston assembly is further defined by a piston having a contact surface engaging said diaphragm, wherein said diaphragm is reciprocable with said piston in response to changes of pneumatic pressure on opposed sides of said diaphragm to actuate said vehicle braking system.

10. A pneumatic brake actuator as set forth in claim 6 wherein said spring guide is fabricated from zinc.

11. A pneumatic brake actuator as set forth in claim 1 including a flexible diaphragm extending between said flange case and said cover inside said head assembly thereby forming a lower pneumatic chamber and an upper spring chamber on opposed sides of said diaphragm.

12. A pneumatic brake actuator for a vehicle braking system, comprising:

a spring chamber assembly defined by a head and a flange case;

a spring disposed inside said spring chamber, said spring having a distal end and a piston end, said spring including terminal ends disposed radially inwardly from a peripheral edge of said spring;

a spring guide configured to receive said distal end of said spring and preventing any portion of said spring from contacting said head and said spring guide being an insulator for preventing a galvanic cell from forming between said spring, said head and said spring guide when said spring is disposed in either a compressed or decompressed condition.

13. A pneumatic brake actuator as set forth in claim 12 including a diaphragm having a moveable wall actuated by a piston and separating said head from said flange case defining a pneumatic chamber and a spring chamber.

14. A pneumatic brake actuator as set forth in claim 13 wherein said spring guide presents a neck portion for receiving said spring and a flange portion extending radially outwardly thereby preventing a widest portion of said spring from contacting said head.

15. A pneumatic brake actuator as set forth in claim 14 wherein said neck portion presents an inner wall spaced from and outer wall by a bottom portion and said outer wall being integral with said flange portion.

16. A pneumatic brake actuator as set forth in claim 15 including a wedge extending from said outer wall defining a receptor for receiving said distal end of said spring.

17. A pneumatic brake actuator as set forth in claim 16 wherein said flange includes a scalloped portion defining a groove with said outer wall for receiving said distal end of said spring thereby providing alignment to said spring when said spring is compressed.

18. A pneumatic brake actuator as set forth in claim 17 wherein said spring guide is formed from a composite material thereby providing insulating properties to said assembly.

19. A pneumatic brake actuator as set forth in claim 18 wherein said piston assembly is further defined by a piston having a contact surface engaging said diaphragm and said diaphragm is reciprocable with said piston in response to changes of pneumatic pressure in said pneumatic chamber.

20. A pneumatic brake actuator for a vehicle braking system comprising:

a flange case;

a cover cooperable with said flange case defining a head assembly therebetween;

a flexible diaphragm extending between said flange case and said cover inside said head assembly thereby forming a lower pneumatic chamber and an upper spring chamber on opposed sides of said diaphragm;

a power spring disposed inside said upper spring chamber, said power spring including terminal ends disposed radially inwardly from a peripheral edge of said power spring;

a piston assembly disposed in said head assembly, said piston assembly movable in a first direction by said power spring and in a second direction when said lower pneumatic chamber is pressurized thereby compressing said power spring; and a spring guide being an insulator disposed between said cover and said piston assembly in said upper spring chamber, said spring guide being configured to receive said spring and extending radially outwardly to a peripheral edge of said spring when said spring is in a compressed position thereby preventing said power spring from contacting said cover in either a compressed or decompressed position preventing a galvanic cell from forming between said spring, said head, and said spring guide when said spring is disposed in either a compressed or decompressed condition.

21. A pneumatic brake actuator as set forth in claim 20 wherein said spring guide presents a neck portion extending to a flange portion terminating into said peripheral edge.

22. A pneumatic brake actuator as set forth in claim 21 wherein said neck portion presents an inner wall extending to a bottom portion and then to an external wall being spaced from said inner wall with said external wall further extending to said flange portion.

23. A pneumatic brake actuator as set forth in claim 22 including a wedge portion extending from said external wall and presenting a front wall extending generally perpendicular to said external wall to engage one of the terminal ends of said spring.

24. A pneumatic brake actuator as set forth in claim 23 including a scalloped portion defined in said flange of said spring guide with said scalloped portion being spaced from said external wall for locking said spring with said spring guide and prevent relative movement of said spring beyond said scalloped portion as said spring is moved between compressed and decompressed positions.

25. A pneumatic brake actuator as set forth in claim 24 wherein said spring guide is fabricated from a polymeric material.

26. A pneumatic brake actuator as set forth in claim 25 wherein said polymeric material includes a nylon filled with a glass.

27. A pneumatic brake actuator as set forth in claim 26 wherein said piston assembly is further defined by a piston having a contact surface engaging said diaphragm, wherein said diaphragm is reciprocable with said piston in response to changes of pneumatic pressure on opposed sides of said diaphragm to actuate said vehicle braking system.

* * * * *